No. 803,731. PATENTED NOV. 7, 1905.
J. H. TOMLINSON.
DRINKING FOUNTAIN.
APPLICATION FILED JULY 24, 1905.
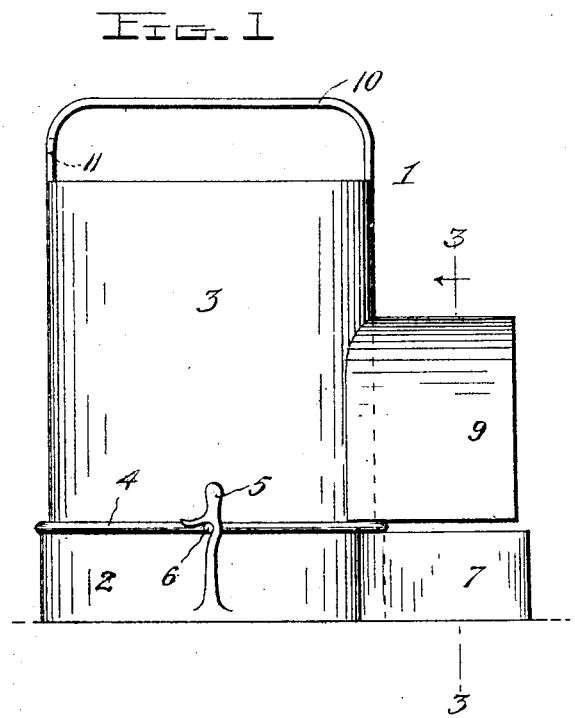
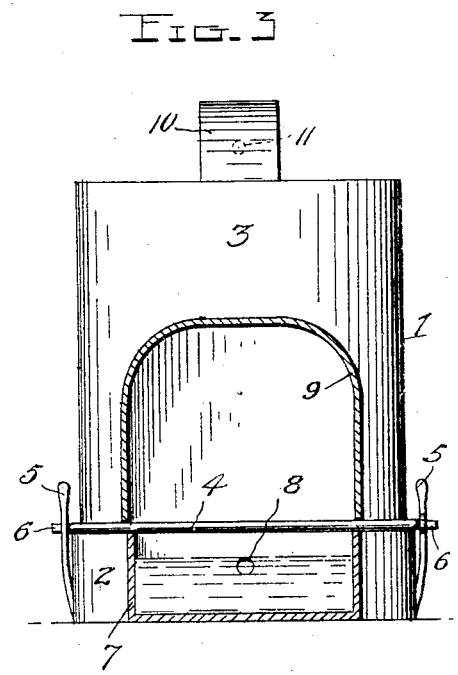
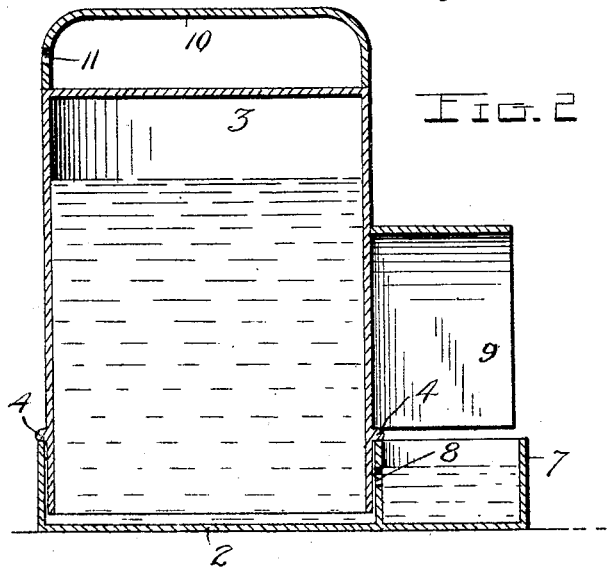
Inventor
John H. Tomlinson

UNITED STATES PATENT OFFICE.

JOHN H. TOMLINSON, OF DETROIT, MICHIGAN.

DRINKING-FOUNTAIN.

No. 803,731. Specification of Letters Patent. Patented Nov. 7, 1905.

Application filed July 24, 1905. Serial No. 271,026.

*To all whom it may concern:*

Be it known that I, JOHN H. TOMLINSON, a citizen of the United States, residing at Detroit, in the county of Wayne and State of Michigan, have invented certain new and useful Improvements in Drinking-Fountains; and I do declare the following to be a full, clear, and exact description of the invention, such as will enable others skilled in the art to which it appertains to make and use the same.

My invention relates to improvements in drinking-fountains for poultry, pigeons, and other fowls or animals.

The object of the invention is to provide a sanitary device of this character which will be of simple and comparatively inexpensive construction and very convenient and durable in use.

With the above and other objects in view the invention consists of certain novel features of construction, combination, and arrangement of parts, as will be hereinafter more fully described and claimed.

In the accompanying drawings, Figure 1 is a side elevation of my improved drinking-fountain. Fig. 2 is a vertical longitudinal sectional view through the same, and Fig. 3 is a sectional view taken on the plane indicated by the line 3 3 in Fig. 1.

Referring to the drawings by numeral, 1 denotes my improved drinking-fountain, which comprises a base 2 and a water reservoir or tank 3. The latter, as illustrated, is cylindrical in form and is adapted to have its bottom fit within the base 2, which is in the form of a pan or tray, as clearly shown in Fig. 2 of the drawings. The bottom of the reservoir 3 is open, and it is supported above the bottom of the base or pan 2 by means of an annular bead 4, which is provided upon the outside of the reservoir and adapted to engage the upper edge of the side wall of the base 2, as shown. This bead 4 also prevents dust or dirt from entering the base 2 between the reservoir and the side wall of said base. The reservoir is retained in the base-pan preferably by two spring-catches 5, which are in the form of resilient hooks secured upon the outer sides of the base 2 at diametrically opposite points and adapted to engage studs 6, provided upon the reservoir, as clearly shown in Fig. 1 of the drawings. The base-pan 2 is provided at one side with an extended portion 7, which forms a drinking compartment or pan 6 in communication with the main compartment or pan 2 through an opening 8, formed in the side wall of the latter. This drinking-pan 7 may be of any desired size and shape and is adapted to be guarded by a curved hood 9, which projects from the side of the reservoir 3. This hood 9 guards the pan 7 and prevents the water therein from being contaminated by the fowls.

To permit the device to be readily carried from place to place, a handle 10 is provided upon the top of the reservoir or receptacle 3, and to permit it to be suspended from a wall an opening 11 is formed in one end of the handle 10 to receive a hook, nail, or other supporting device.

The construction, operation, and advantages of the invention will be readily understood from the foregoing description, taken in connection with the accompanying drawings. It will be seen that when it is desired to fill the receptacle 3 the studs 6 are disengaged from the catches 5, and said receptacle is inverted and filled. The base-pan 2 is then secured upon the open bottom of the receptacle while the latter is in its inverted position, and the device is then restored to its normal position, whereupon the water will pass through the opening 8 and fill the drinking pan or compartment 7, a constant level of water being maintained therein until the receptacle 3 is emptied. It will be seen that the fowl or other animals using the device cannot dirty the water in the pan 7, since the hood 9 will guard the same.

Various changes in the form, proportion, and the minor details of construction may be resorted to without departing from the principle or sacrificing any of the advantages of the invention.

Having thus described my invention, what I claim as new, and desire to secure by Letters Patent, is—

1. A device of the character described, comprising a base-pan having communicating compartments, a reservoir adapted to be inverted in one of said compartments, and a hood upon said reservoir to guard the other compartment of said base-pan, substantially as described.

2. A device of the character described, comprising a base-pan having communicating compartments, a reservoir adapted to be inverted in one of said compartments, a bead upon said reservoir to engage the upper edge of said pan and support said reservoir, means for retaining said reservoir in said pan, and a hood upon said reservoir adapted to guard the other compartment of said base-pan, substantially as described.

3. A drinking-fountain comprising a base-pan having communicating compartments, a reservoir having an open end adapted to project into one of said compartments, a bead upon said reservoir to engage the top of said pan and support said reservoir, studs upon said reservoir, spring-catches upon said pan adapted to engage said studs, a handle upon said reservoir, and a hood upon said reservoir adapted to guard the other compartment of said pan, substantially as described.

In testimony whereof I have hereunto set my hand in presence of two subscribing witnesses.

JOHN H. TOMLINSON.

Witnesses:
F. E. VAN AMERINGLA,
HERBERT A. FARR.